C. O. LINE.
Culinary Vessel.
No. 167,106.            Patented Aug. 24, 1875.
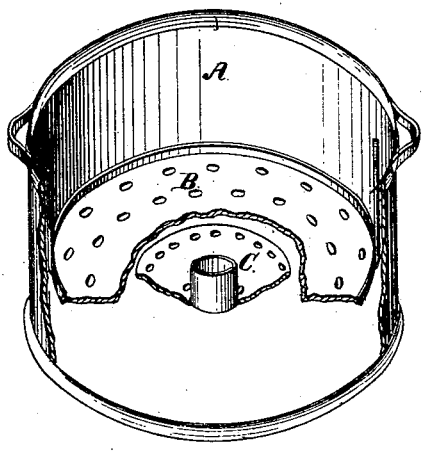
Fig. 1
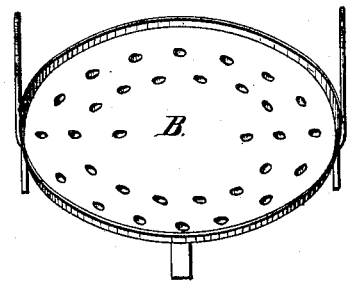
Fig. 2
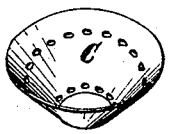
Fig. 3
Fig. 4
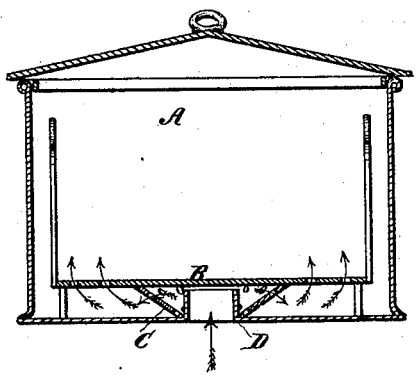
Fig. 5
Witnesses.
W. M. Bussell
E. T. Bussell
Inventor.
Cornelia O. Line

UNITED STATES PATENT OFFICE.

CORNELIA O. LINE, OF INDIANAPOLIS, INDIANA.

IMPROVEMENT IN CULINARY VESSELS.

Specification forming part of Letters Patent No. 167,106, dated August 24, 1875; application filed January 26, 1875.

*To all whom it may concern:*

Be it known that I, CORNELIA O. LINE, of Indianapolis, State of Indiana, have invented a Steam Culinary Vessel, of which the following is a specification:

The object of my invention is to afford a cheap and convenient means of utilizing the heat contained in the steam of boiling water for purposes of cooking victuals.

The invention is illustrated in detail in the drawings herewith, and to which reference is made.

Figure 1 is a partially cut-away vertical transverse section. Fig. 2 is a movable perforated bottom, on which the article to be cooked is laid. Figs. 3 and 4 are a perspective and plan view of the steam distributing-disk; and Fig. 5 is a vertical transverse section of the entire vessel, showing the true relation of all its parts, each to the other.

A is the body of the culinary steamer, made of sheet-tin, tinned iron, or other metal. It may be oval, round, or square in shape, and of any required size, having a plain flat bottom, with a perforation in its center for the admission of steam, and a tight-fitting lid or cover for the top. The perforation D in the bottom of this vessel should be large enough to permit the free ingress of steam from a pot or other vessel of boiling water, upon which A must be placed when in use. The perforation D has a sleeve or thimble soldered to it on the inside, which serves the purpose of guide and stay for holding C in position, and likewise to discharge the inflowing steam directly against the center and under side of B. B is a movable and partially-perforated bottom, made smaller than A, into which it fits loosely, having legs on its under side, which rest upon the inside of the bottom of A. When the concave disk C is in position, as seen in Fig. 5, these legs permit B to just reach and rest upon the periphery of C. The blank space in the center of B, where there is no perforation, must be always as large as the diameter of C, in order that no steam be allowed direct passage to the chamber above B. Perforations are made all around this blank center. B is provided with long wire handles at opposite ends, that it may be conveniently placed within or taken out of A when the vessel is in use.

The mode of operation is this, viz: Bread, meats, pies, fruits, or other edibles to be cooked in this vessel, are placed upon B, and, having C in its proper position, its concave upward, B is let down into A until it rests on its legs, and also on the periphery of C. A is then covered with its lid and set on top of any pot or other small vessel of boiling water. The steam passes up through the perforation D, and impinges directly upon the under side of the blank space in B. The moister and cooler portion of the steam is condensed by this contact, or impact, into water, escaping through the small apertures at the lower part of C, while the dryer and hotter steam rebounds and escapes through the small openings in and near the periphery of C, taking the direction shown by the arrows, and finding its way into the chamber above.

By this means almost any kind of food may be well and thoroughly cooked without liability of being scorched. Even pastry and other semi-solid edibles are quickly cooked without the slightest risk of further solution by moist steam of low temperature.

Bread and pound-cake cooked in this vessel have no hard crust, while the natural and delicious flavor of every article so cooked is faithfully preserved.

A small tube or outlet is affixed in the side of A, near the bottom, through which the accumulating water from condensing steam may be drawn as required. It is closed with a cork when not so used.

The unperforated portion of the plate B rests directly upon the open top of the separate outward-flaring ring C, and is supported upon the edge of said ring, so that the steam entering the flaring ring is partially held in direct contact with the plate upon which the article to be cooked rests. This flaring ring is held in position by the central sleeve D, over which it is fitted, so that it can be removed and cleaned when necessary, and its perforations kept free from the drippings from the articles being cooked.

I am aware that culinary steamers have been constructed with a perforated diaphragm and a conical bottom, and that a perforated conducting-pipe, closed at the top, has been placed in the bottom of the cooking-vessel, for delivering the steam beneath and upon a grate-bottom.

I claim—

The detachable perforated outwardly-flaring ring C, combined with the sleeve D, which holds it in place, the partially-perforated plate B, which rests upon its open top, and the vessel A, as shown and described.

CORNELIA O. LINE.

Witnesses:
  W. M. BUSSELL,
  E. T. BUSSELL.